Oct. 15, 1929.  F. CARRIER  1,732,037
MILK BOTTLE CONTAINER
Filed April 1, 1927   2 Sheets-Sheet 2
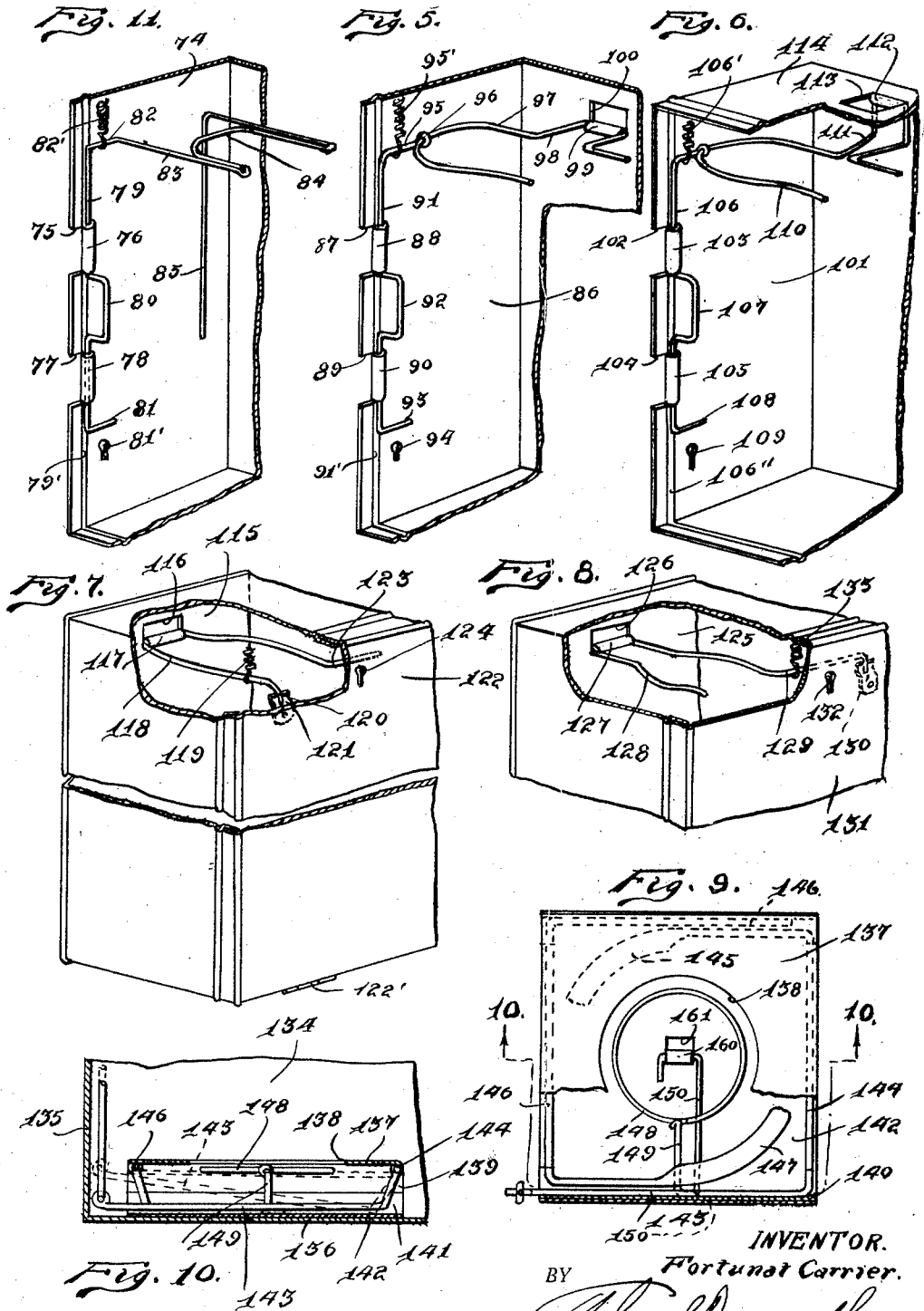
INVENTOR.
Fortunat Carrier.
BY
ATTORNEY Patented Oct. 15, 1929

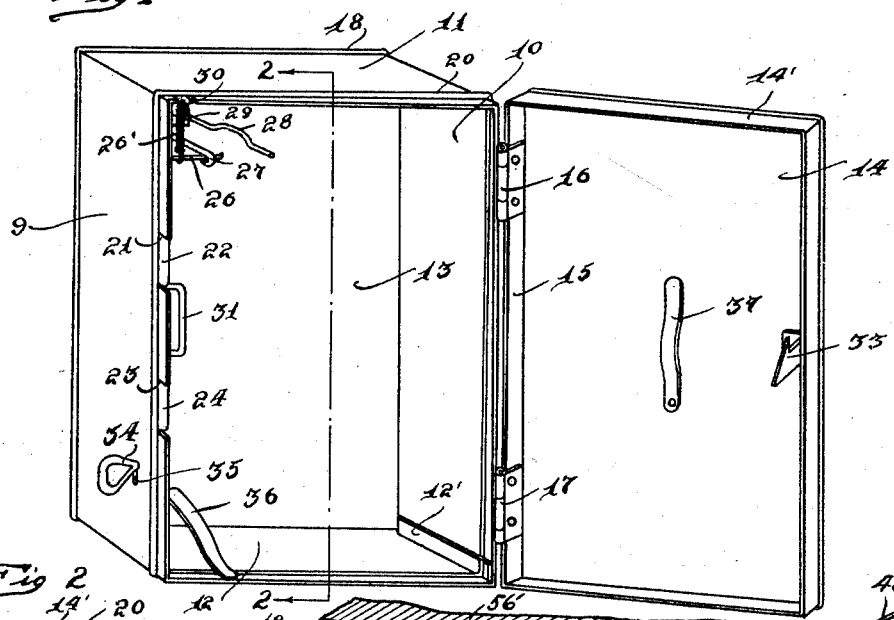
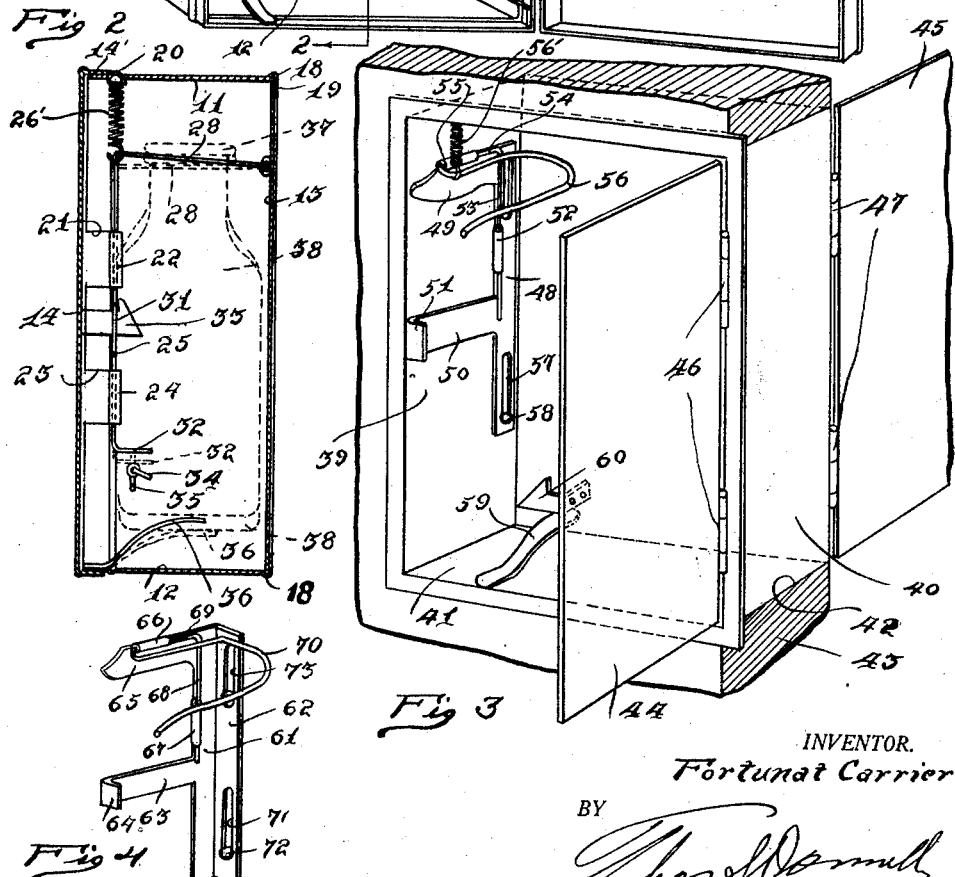

1,732,037

UNITED STATES PATENT OFFICE

FORTUNAT CARRIER, OF DETROIT, MICHIGAN

MILK-BOTTLE CONTAINER

Application filed April 1, 1927. Serial No. 180,090.

My invention relates to a new and useful improvement in a milk bottle container and has for its object the provision of a container in which a milk bottle may be positioned and which, upon the placing of the milk bottle therein and the closing of the door thereof, will automatically lock the door in closed position so that an undue removal of the milk bottles therefrom will be prevented.

It is an object of the present invention to provide a type of lock and releasing mechanism which will be easily operated, durable in structure, cheaply and quickly installed.

It is another object of the invention to provide in a device of this kind a latching and releasing mechanism which may be operated from one of the side walls of the container.

Other objects will appear hereinafter.

The invention consists in the combination and arrangement of parts hereinafter described and claimed.

The invention will be best understood by a reference to the accompanying drawings which form a part of the specification and in which, Fig. 1 is a perspective view of the invention showing the door open.

Fig. 2 is a sectional view taken on substantially line 2—2 of Fig. 1.

Fig. 3 is a perspective view of a modified form of the invention.

Fig. 4 is a perspective view of the latching mechanism of the form shown in Fig. 3.

Fig. 5 is a fragmentary perspective view of a further modified form of the invention.

Fig. 6 is a fragmentary perspective view of a further modified form of the invention.

Fig. 7 is a fragmentary perspective view of a further modified form of the invention.

Fig. 8 is a fragmentary perspective view of a further modified form of the invention.

Fig. 9 is a top plan view of a further modified form of the invention with a part broken away and a part shown in section.

Fig. 10 is a sectional view taken on substantially line 10—10 of Fig. 9.

Fig. 11 is a fragmentary perspective view of a further modified form of the invention.

In the preferred form I have illustrated the container provided with side walls 9 and 10, a top wall 11, a bottom wall 12, and a rear wall 13. A door 14 having a flange 14' and 15' projecting outwardly from its inner facing is hingedly connected at 16 and 17 to the side wall 10. A bead 18 is formed at the rear of the container. The side walls and the top and bottom wall are preferably made from a single piece of material, the bottom being provided with an upwardly projecting flange 12' which is welded or otherwise suitably secured to the wall 10. Projecting inwardly from the rear edge of this material is a flange 19 which serves to engage and retain in position the rear wall 13. An outwardly projecting bead 20 is formed at the forward side of these walls. The forward edge of the wall 9 is cut away as at 21 to provide a tongue 22. A similar tongue 24 is formed by cutting away the front edge of the wall 9 at 23, these tongues being curled to form knuckles in which slidably extends the rod 25, the upper end 26 of which is laterally turned to project inwardly from the side wall 9 to engage in an eyelet 27 of a yoke having the leg 28, this yoke being swingably mounted on the rear wall 13. Secured to the tongue 30 on the top wall 11 and projecting downwardly therefrom is a spring 26' which serves normally to retain the yoke in the position shown in full lines in Fig. 2.

The rod 25 is formed intermediate its ends into an outwardly projecting handle 31. The lower end of the rod is angularly turned as at 32. Projecting inwardly from the door 14 is a latch 33 which is fixedly mounted on the door and which when the door is in closed position is adapted to enter the handle 31. When the rod 25 is moved downwardly the upper edge of the handle 31 engages behind the latch thus locking the door in closed position. A slot 35 is formed in the side wall 9 and a suitable key 34 is adapted for projecting into the slot 35, this key serving to engage the angularly turned portion 32 and moving the rod 25 upwardly to disengage the upper edge of the handle 31 and permit the door to be opened. Mounted on the bottom 12 of the housing and extending upwardly therefrom is a curved leaf spring 36. When a bottle 38 of milk is placed with its neck in engagement with the yoke, the bead 37 will serve to hang the bottle on the yoke. The spring 36 is intended to support the bottle 38 when it is empty, the spring 26' serving to assist in this operation. When the door is closed with an empty bottle supported by the yoke, the rod 25 will not be moved downwardly and consequently a latching of the door in closed position will not take effect. When the bottle is filled, the leaf spring 36 will be moved, on account of the weight of the bottle, to the position shown in dotted lines in Fig. 2 and the rod 25 will also be moved to the position shown in dotted lines in Fig. 2. It is thus evident that the full bottle will be of sufficient weight to lock the housing so as to prevent the undue removal of the bottle therefrom.

In Fig. 3 I have shown a slightly modified form of the structure in which a housing having side walls 39 and 40 and a bottom wall 41 are mounted in a recess 42 formed in the structure 43 of the building with which used. A door 44 is hingedly connected at 46 on one side of the housing and a door 45 is hingedly connected at 47 to the other side so that the housing may be mounted in a wall, access to the housing being had from either side of the wall. Slidably mounted on the wall 39 is a bar 48 having at its upper end the angularly turned portion 49 and intermediate its end a tongue 50 with an angularly turned end 51. The bar is provided with elongated slots 57 in which engage rivets 58 secured to the wall 39. Positioned in a knuckle 52 formed on the bar 48 is the downwardly projecting end 53 of a wire having at its upper end the angularly turned portion 54 which extends through the knuckle 55 formed on the angularly turned portion 49 of the bar. This wire is doubled upon itself to provide a yoke 56. A leaf spring 59 is mounted on the base 41 and projecting inwardly from the door 44 is the latch 60 which is adapted to engage behind the angularly turned portion 51 for locking the door in closed position. A spring 56' serves normally to retain the bar 48 in its upwardly moved position.

It will be noted in Fig. 3 that the bar 48 is slidably mounted on the side wall 39.

In Fig. 4 I have shown a slightly modified form in which the bar 61 has the angularly turned flange 62. The tongue 63 projects outwardly from intermediate the ends of the bar 61 and is provided with the angularly turned end 64. At the upper end of the bar 61 is the outwardly projecting angularly turned portion 65 having a knuckle 66 in which engages the angularly turned portion 69 of the wire 68 which extends through the knuckle 67. This wire is formed into a yoke 70 and the flange forming portion 62 is provided with a slot 71 in which engages the rivet 72 and with a slot 73 in which also engages a rivet, these rivets being secured to the rear wall of the housing, the rear of the housing in this instance being closed.

In Fig. 11 I have shown a further modified form in which the side wall 74 is provided on its edge with a notch 75 to provide a tongue curled to form a knuckle 76. A notch 77 is also cut in the forward edge of the wall 74 and curled to form a knuckle 78. A downwardly projecting wire 79 projects through these knuckles 76 and 78 and rests in a groove 79' formed on the inner surface of the side wall 74. The rod 79 is outwardly offset intermediate its ends to provide a handle 80. The upper end of the rod 79 is angularly turned as at 82 and again angularly turned at at 83 and formed into a yoke 84, a downwardly projecting portion 85 being formed on the yoke 84.

In Fig. 5 I have shown a slightly modified form in which notches 87 and 89 are formed in the side wall 86 to provide knuckles 88 and 90 through which is projected a wire 91 having its lower end 93 angularly turned and lying throughout its main body in a groove 91', an outwardly projecting handle 92 being formed on the wire 91. The angularly turned end 95 of the wire is attached to a spring 95' and provided with an eyelet 96 engaging the yoke 97 which is provided with an angularly turned U shaped portion swingably mounted in a knuckle 99 formed from a tongue struck from a recess 100 in the rear wall of the housing.

In Fig. 6 I have shown a further modified form in which the side wall 101 is provided with the recesses 102 and 104 to provide tongues formed into knuckles 103 and 105 in which is slidably mounted the wire 106 having the U shaped offset portion intermediate its ends and angularly turned at its lower end as at 108, a slot 109 being formed in the side wall 101 to accommodate a key for raising the rod 106, the upper end of the rod 106 is angularly turned and fastened to one end of a spring 106', the other end of which is attached to the top 114. This wire 106 engages in a groove 106" formed in the side wall 101.

An opening 113 is formed in the top 114 to provide a tongue which is formed into a knuckle 112 in which is hingedly mounted the angularly turned U shaped portion 111 of the yoke 110.

In Fig. 7 I have shown a further modified form in which an opening 116 is formed in the side wall 115 to provide a tongue curled to form the knuckle 117 in which the yoke 118 is swingably mounted, a spring 119 serving normally to retain the yoke in elevated position so that its angularly turned end 120 does not engage behind the clip 121 which is mounted on the door 122. The other end of the yoke is angularly turned as at 123 to extend above the key opening 124. In this form the door 122 is hingedly connected at its lower edge as at 122'.

In Fig. 8 I have shown a further modified form in which an opening 126 is formed in the wall 125 to provide a knuckle 127 in which is swingably mounted the yoke 128 having the angularly turned end 129 extending over the key opening 132 and adapted to engage behind the clip 130 mounted on the door 131. A spring 133 serves normally to retain the yoke 128 in elevated position.

In Fig. 9 I have shown a further modified form in which a housing 137 provided with an opening 138 is utilized, this housing having a side wall 139. This side wall 139 telescopes with an upwardly projecting side wall 141 which extends upwardly from the plate 142 positioned on the floor 136 of the housing. A wire 143 is pivotally mounted and provided at one end with the extension 145. The wire 146 is provided with the extension 147 and the loop 148 is mounted beneath the opening 138 and provided with the angularly turned portion 149. The wire 150 is pivotally mounted in a knuckle 160 struck from the opening 161. The arrangement is such that when the bottle is placed on the cover 137 the latch mechanism will be operated.

While I have illustrated and described the preferred form of my invention I do not wish to limit myself to the precise details of structure shown, but desire to avail myself of such variations and modifications as come within the scope of the appended claims.

Having thus described my invention what I claim as new and desire to secure by Letters Patent is:

1. A container of the class described, comprising: a housing adapted for the reception of a bottle; a yoke swingably mounted adjacent the top of said housing; a pair of knuckles in vertical alignment with each other on one of the side walls of said housing; a rod attached to said yoke and angularly turned and downwardly projected slidably through said knuckles; a U-shaped portion formed on said rod intermediate said knuckles; a door swingably mounted on said housing; a latch member on said door engageable with said U-shaped portion for latching said door in closed position, said U-shaped portion disengaging from said latch upon movement of said yoke to upward position; and a spring projected downwardly from the top of said housing and connecting to said rod for normally retaining said yoke in upward position.

2. A container of the class described, comprising: a housing adapted for the reception of a bottle; a yoke swingably mounted adjacent the top of said housing; a pair of knuckles in vertical alignment with each other on one of the side walls of said housing; a rod attached to said yoke and angularly turned and downwardly projected slidably through said knuckles; a U-shaped portion formed on said rod intermediate said knuckles; a door swingably mounted on said housing; a latch member on said door engageable with said U-shaped portion for latching said door in closed position, said U-shaped portion disengaging from said latch upon movement of said yoke to upward position; and a spring projected downwardly from the top of said housing and connecting to said rod for normally retaining said yoke in upward position, said knuckles being formed from tongues punched from an edge of said side wall; an angularly turned portion on the lower end of said rod, said wall having a key opening formed therein for reception of a key adjacent the position of said angularly turned end of said rod.

In testimony whereof I have signed the foregoing specification.

FORTUNAT CARRIER.